United States Patent
Hashmi

(10) Patent No.: US 10,798,179 B2
(45) Date of Patent: Oct. 6, 2020

(54) SERVICE ENDPOINT INTERCONNECT IN A VIRTUAL PRIVATE GATEWAY

(71) Applicant: AMAZON TECHNOLOGIES, INC., Seattle, WA (US)

(72) Inventor: Omer Hashmi, Chevy Chase, MD (US)

(73) Assignee: Amazon Technologies, Inc., Seattle, WA (US)

(*) Notice: Subject to any disclaimer, the term of this patent is extended or adjusted under 35 U.S.C. 154(b) by 664 days.

(21) Appl. No.: 15/422,076

(22) Filed: Feb. 1, 2017

(65) Prior Publication Data

US 2018/0219951 A1  Aug. 2, 2018

(51) Int. Cl.
  G06F 15/16  (2006.01)
  H04L 29/08  (2006.01)
  H04L 12/46  (2006.01)
  H04L 12/66  (2006.01)
  H04L 29/06  (2006.01)

(52) U.S. Cl.
  CPC ........ *H04L 67/141* (2013.01); *H04L 12/4633* (2013.01); *H04L 12/4641* (2013.01); *H04L 12/66* (2013.01); *H04L 63/0272* (2013.01); *H04L 67/146* (2013.01); *H04L 63/0414* (2013.01); *H04L 63/0442* (2013.01); *H04L 63/102* (2013.01)

(58) Field of Classification Search
  None
  See application file for complete search history.

(56) References Cited

U.S. PATENT DOCUMENTS

2013/0056763 A1* 3/2013 Koyama ............ H01L 27/1225
                                                             257/88
2014/0317276 A1* 10/2014 Tie ...................... H04L 45/306
                                                           709/224

(Continued)

OTHER PUBLICATIONS

Amazon Virtual Private Cloud User Guide API Version Apr. 15, 2015 (Year: 2015).*

(Continued)

*Primary Examiner* — Brian Whipple
*Assistant Examiner* — Anthony T Rotolo
(74) *Attorney, Agent, or Firm* — Robert C Kowert; Kowert, Hood, Munyon, Rankin & Goetzel, P.C.

(57) ABSTRACT

A system includes a virtual private gateway (VGW) provisioning service that is configured to receive a request to establish a VGW. The request specifies a service accessible through the VGW and a customer-configurable policy. The policy restricts access to the specified service to requests sent via the VGW to the specified service. Responsive to the request, the VGW provisioning service instantiates a VGW virtual machine. The VGW virtual machine includes a VGW application configured to establish a secure tunnel over a public network to a remote node and to receive encrypted traffic from the remote node over the secure tunnel. The VGW provisioning service also causes route data for the specified service to be provided to the VGW virtual machine. The VGW application advertises the route data for the specified service over the secure tunnel. The VGW provisioning service provides the policy to the identified service for compliance thereon.

20 Claims, 6 Drawing Sheets

(56) References Cited

U.S. PATENT DOCUMENTS

| | | | |
|---|---|---|---|
| 2016/0036861 A1* | 2/2016 | Mattes | H04L 63/0272 |
| | | | 726/1 |
| 2016/0127454 A1* | 5/2016 | Maheshwari | H04L 47/70 |
| | | | 709/223 |
| 2016/0285831 A1 | 9/2016 | Doane et al. | |
| 2017/0063927 A1* | 3/2017 | Schultz | H04L 63/20 |

OTHER PUBLICATIONS

Hallivuori, Ville. "A Concept for Protecting Stateful Routing Protocols." Sep. 7, 2001, Retrieved from http://www.tml.tkk.fi/Publications/Thesis/hallivuori.pdf.

Results of the Partial International Search in counterpart application PCT/US2018/015228, dated Mar. 28, 2018.

"Amazon Virtual Private Cloud: User Guide" Jan. 21, 2007, pp. 1-279.

\* cited by examiner

SERVICE ENDPOINT INTERCONNECT IN A VIRTUAL PRIVATE GATEWAY

BACKGROUND

Public service providers offer hardware devices (e.g., servers, storage drives, etc.) and services that customers can use to thereby avoid the customers from having to own and operate such equipment. Some service providers provide an assortment of services to its customers, which the customers access from their own devices over a public network. Communications between the customer devices and the provider network traverse over public networks such as the Internet and may not be encrypted.

BRIEF DESCRIPTION OF THE DRAWINGS

For a detailed description of various examples, reference will now be made to the accompanying drawings in which.

DETAILED DESCRIPTION

Figure 1:
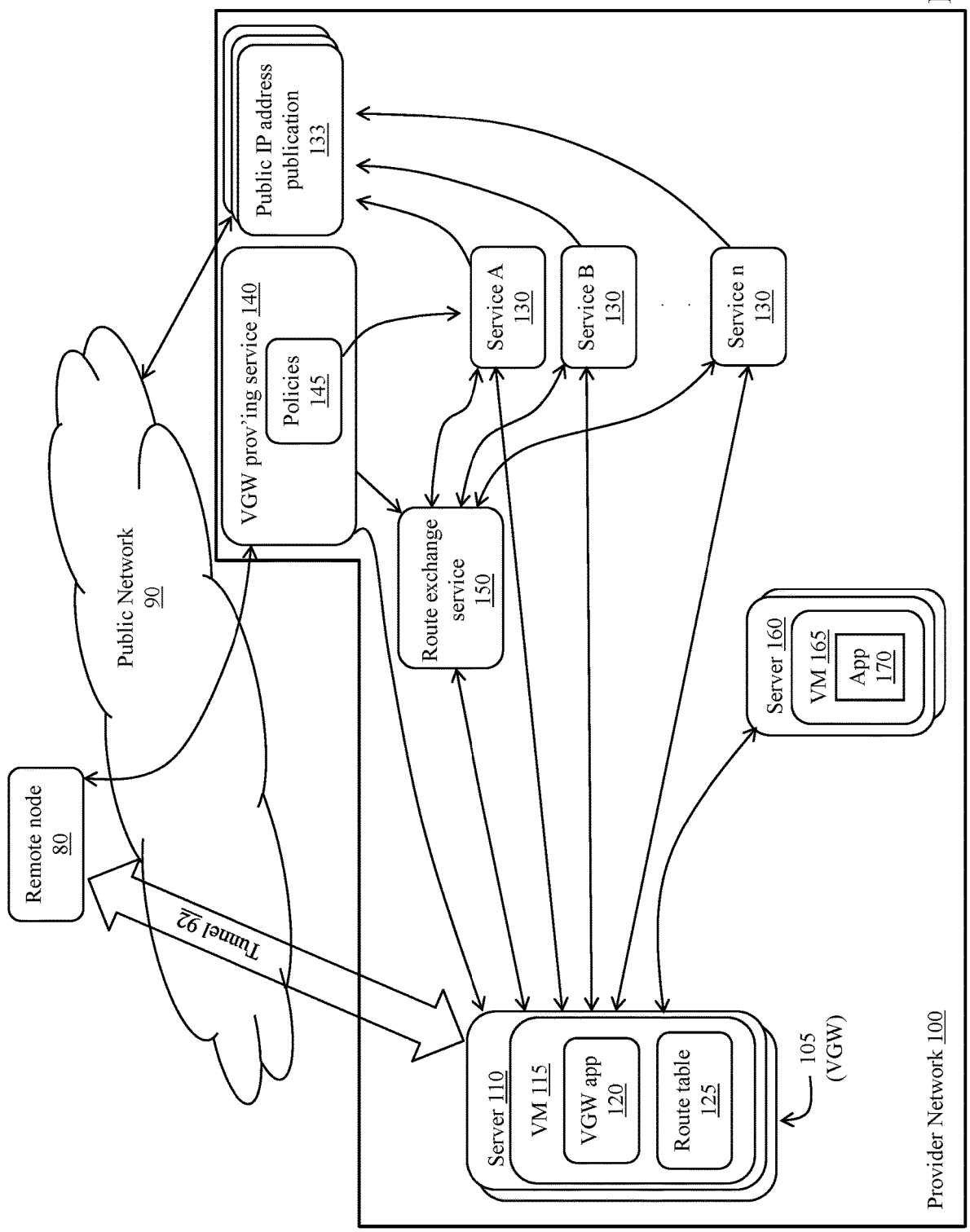
FIG. 1 shows a system in accordance with various examples.

The embodiments described herein illustrate a provider network which permits each of its customers to create and use a virtual private gateways (VGW) to establish a secure (e.g., encrypted) tunnel between the customer's remote node (i.e., remote from the provider network) and the VGW. The encrypted tunnel can be used by the customer to submit requests for services (e.g., storage services) executing within the provider network. From the remote node, a customer can encrypt, or cause to be encrypted, a request for a provider network-hosted service. The encrypted packet is transmitted across the secure tunnel to the VGW. The VGWs may be implemented, for example, as an application executing within a virtual machine, which itself executes on a compute device such as a server within the provider network. The application may perform the functionality described herein attributed to the VGW. The VGW operates as a service endpoint and decrypts the packet to recover the service request and, using route data for the targeted service in a route table, forwards the service request over an internal network of the service provider for delivery to a server on which the targeted service executes. The service then may execute the service request. Any response packets generated by the service to be returned to the remote node may be transmitted back to the VGW, which then encrypts the packet and transmits the encrypted packet over the tunnel to the remote node. As such, the customer can access the services through a dedicated encrypted tunnel to the VGW rather than by submitting service requests to public internet protocol (IP) addresses associated with the services.

In some embodiments, the provider network may include a VGW provisioning service to which customers can submit requests for creation of VGWs. In response to receipt of a request to create a VGW for a given customer, the provisioning service selects a server on which to load and execute a VGW virtual machine. The VGW virtual machine may comprise a machine image that includes the application noted above which implements the functionality of the VGW. The request to create a VGW also may include an identifier of one or more services to which the customer desires access through the encrypted tunnel.

In some embodiments, the VGW may include a route table which contains route data which facilitates the VGW determining to where to send incoming packets received by the VGW. The service(s) specified by the customer to be accessible via the customer's VGW may generate route data such as prefix lists that include a prefix list identifier and a canonical name of the corresponding service. The prefix list identifier may logically represent a range of public IP addresses for the service. Other forms of route data besides prefix lists are possible as well. The provider network may implement a route exchange service which permits the services to provide and update their route data to be redistributed to the VGWs that are configured to access each such service. After creation of the VGW, the VGW provisioning service may submit a request to the route exchange service. The request specifies which service(s) a VGW is to be configured to access, and the route exchange service may provide the route data for the specified service to the VGW, which then adds such route data to its route table.

The provisioning service also may be accessed by each customer to create a policy for a given service that the customer has specified to be accessible via his or her VGW. In one example, the policy may specify that only service requests that flow through the VGW (and thus through the encrypted tunnel to the VGW) are to be honored by the service. Other types of policies are possible as well. The policies may be provided to the corresponding services and implemented by such services.

FIG. 1 shows an example of a provider network 100, which includes a plurality of servers (e.g., servers 110 and 160), a plurality of services 130, a VGW provisioning service 140, and a route exchange service 150. Virtual machines 165 may be installed and executed on servers 160 on behalf of customers of the provider network. A customer may have one or multiple virtual machines 165 and may have customer-specific software executing within each such virtual machine to support the needs of the customer (e.g., business applications of a business). Communications may be established between compute entities within the provider network and remote nodes (e.g., remote node 80) over a public network. In the example of FIG. 1, communication connectivity is illustrated to a remote node 80 over a network 90. The network 90 may comprise a public network (e.g., the Internet) and comprise any one or more of wide area networks, local area networks, wired networks, wireless networks, etc.

The remote node 80 may comprise a single computer or a collection of computers networked together. In some embodiments, the remote node 80 may comprise a gateway within a datacenter of the customer, or may be the datacenter itself. The remote node 80 may be used to access the VFW provisioning service 140 to thereby request a VGW to be created for the customer. An example of the implementation of a VGW 105 for a given customer is shown in FIG. 1 as a server 110 on which VGW application 120 has been installed and is executing. Once the VGW 105 has been created, using, or through, the remote node 80, a customer may establish a secure tunnel 90 to the VGW as explained below.

The VGW application 120 may execute within a virtual machine 115, which itself executes on the server 110. Similarly, the servers 160 may be used to execute virtual machines 165 in which customer-specific applications 170 may execute. Further, any one or more of the services 130 (e.g., Service A, Service B, . . . , Service n) and the VGW provisioning service 140 may comprise applications executing within virtual machines that execute on physical servers. As such, the provider network 100 is configured to launch and execute virtual machines on servers for a variety of uses.

A virtual machine is a software implementation of a physical computer system. Virtual machines may provide for multiple and/or different operating system environments to run concurrently on a single host computer. In one example, multiple virtual machines of a Linux® operating system environment may execute concurrently with multiple instances of a Microsoft® Windows® operating system environment on a single physical computer. A virtual machine may interact with a hypervisor or a virtual machine monitor (or other type of virtualization system) which are programs that execute on the physical computer that allow multiple guest operating systems to share a single hardware host. Each virtual machine operating system appears to have exclusive access to the host's processor, memory, and other resources. However, the hypervisor controls the host processor and resources, allocating resources that are needed to each virtual machine's operating system in turn and ensuring that the guest operating systems of the virtual machines do not disrupt each other. Each virtual machine may be controlled by a respective customer. The virtual machines created by the customer (e.g., virtual machines 165) can be loaded by the customer with whatever customer-specific applications the customer so chooses. For example, the customer's applications may comprise web server applications, data processing applications, or any other type of functionality that the customer desires. The applications executing within the virtual machines may be pre-stored in the machine images used to boot such virtual machines or may be loaded into the virtual machines post-boot by a provisioning service.

Referring still to FIG. 1, the services 130 may comprise a myriad of services offered by the service provider to its customers. In one example, a service 130 may comprise a storage service, which may permit customers to request an allocation of mass storage and to store data from their remote nodes to their storage allocation. Some or all of the data subsequently can be retrieved from storage and provided to the remote node. In another example, a service may provide a database service. In one embodiment, the database service may provide a flexible non-relational database for use by customers of the provider network. The database may support document and key-value storage models. In another example, a service allows customers to upload their executable code and have it automatically executed by the provider network upon occurrence of a customer-specified triggering event. When the trigger event occurs (e.g., a photograph is uploaded to the system, a sensor limit being exceeded, etc.), the customer-specific code is executed without requiring the customer to provision and manage any virtual machines to run such code. Any, or all, of the services 130 may be implemented as servers executing corresponding applications without the use of virtual machines, but in other embodiments, any of the services may comprise software that may execute within a virtual machine as described above.

In some embodiments, each service 130 may have its public IP address (or range of IP addresses) advertised by a publication IP address publication service 133. Each service 130 may be associated with a separate corresponding instantiation of a public IP address publication service 133, or multiple services 130 may use a common public IP address publication service 133. The public IP addresses for a given service 130 may be advertised over the public network 90, thereby permitting remote devices to submit service requests containing the public IP address. In some cases, a domain name service (DNS) may receive and store the public IP addresses for the service and respond to a DNS request from a remote node to resolve a service name (e.g., a uniform resource locator) into the public IP address for the service.

A customer of the provider network, however, may desire to use one or more of the services 130 and to establish a communication link to the provider network 100 over a secure tunnel for purposes of submitting requests to the provider network for use of the service(s), rather than submitting requests to the public IP address for the targeted service. In the example of FIG. 1, a secure tunnel 92 is illustrated as having been established between the remote node 80 and a VGW 105 that has been created for the customer. As noted above, the VGW may be implemented as a server 110 executing a virtual machine 115, which in turn executes a VGW application 120. The VGW application 120 implements the functionality described herein as attributed to the customer's VGW. In some embodiments, the secure tunnel 92 is an encrypted tunnel meaning that data packets transmitted back and forth on the tunnel are encrypted—that is, encrypted by the source end of tunnel and decrypted by the destination end. As the tunnel 92 may be a bi-directional tunnel, the VGW 105 may decrypt incoming encrypted packets from the remote node 80 and encrypt outgoing packets for transmission across the tunnel 92 to the remote node. Similarly, the remote node 80 may decrypt incoming encrypted packets from the VGW 105 and encrypt outgoing packets for transmission across the tunnel to the VGW.

The customer's VGW 105, which has received the route data for the service as described above, advertises the public address for the service to the customer's remote node 80 along with an identifier of the VGW. At that point, the remote node 80 is configured so that, if it is to generate an access request for the service 130, its route information indicates that a packet to be generated using the service's public IP address is instead created using the IP address of the VGW as the destination address. Thus, the service request packet is sent over the secure tunnel 92 to the VGW rather than to the public IP address of the service itself. As such, the services 130 may be accessible in at least two ways—by packets containing the IP address of the VGW as their destination address and that are transmitted through the secure tunnel 92 and routed to the service by the VGW 105 or by packets that include the public IP address of the service as the destination address.

In some implementations, the tunnel 92 may be implemented using the Internet Protocol Security (IPSec) standard and the ends of the tunnel (i.e., the VGW 105 and the remote node 80) may perform the Internet Key Exchange (IKE) protocol to facilitate the establishment of security associations between the nodes. The IKE protocol includes two phases: Phase I and Phase II. In Phase I, the protocol establishes a secure authenticated communication channel using the Diffie-Hellman key exchange algorithm to generate a shared secret key to encrypt further IKE communications. Authentication may be performed using a pre-shared secret key, digital signatures, or public key encryption. During Phase II, the two IKE peers use the secure channel established in Phase I to negotiate security associations on behalf of other services such as Internet Protocol Security (IPSec). The negotiation results in two unidirectional security associations—one inbound and one outbound. Each security association includes an encryption key used to encrypt/decrypt packets. The Diffie-Hellman and IPSec encryption keys are rotated periodically for added security by performing either or both of the IKE protocol Phase I and Phase II operations. Packets generated and encrypted by the remote node 80 may include requests for use of any of the services 130. Thus, the disclosed embodiments permit customers to submit service requests over an encrypted tunnel to a VGW 105. The VGW decrypts the incoming packets and forwards the service request to the targeted service.

As noted above, a customer can access the VGW provisioning service 140 to request a VGW 105 to be created and allocated for exclusive use by the customer. The request may be submitted to the VGW provisioning service 140 in the form of, for example, an application programming interface (API) call. The API call may a canonical name that specifies the action that the customer desires to be performed. For example, the API call may comprise "VGWCreate( )" where values to be inserted between the parentheses specify various characteristics for the desired VGW 105. For example, the customer may include an identifier of each service 130 to which the customer desires access through the VGW, an identifier of the customer or customer account, credential information used to authenticate the request, a public IP address of the remote node 80 to which the VGW is to establish a tunnel, etc.

In response to the request, the VGW provisioning service 140 may select a physical server 110 from among multiple available servers to use for the VGW. The server selected may or may not currently be executing another application or VGW. The VGW provisioning service 140 causes a machine image to be downloaded to the selected server 110. In one embodiment, a particular machine image may be retrieved from a machine image storage (not shown) and transmitted to the selected host computer. The machine image may include an operating system, drivers, and a VGW application 120 configured to implement some or all of the VGW functionality such as packet encryption and decryption, encryption key rotation for the tunnel 92, routing a packet from a remote node 80 to a targeted service 130, etc. The appropriate machine image is transmitted to and loaded onto a storage drive of the host server. The machine images may be stored in a centralized database or data store within the provider network. Each machine image, including the VGW-based machine images as well as other types of machine images usable by customers to launch other types of virtual machines may have pre-assigned identifiers (IDs). The IDs may be used by the VGW provisioning service to launch a virtual machine as a VGW 105 on the physical server. The VGW provisioning service 140 selects the machine image to copy to the selected server for launching the VGW virtual machine using the ID associated with the machine image needed to implement the VGW functionality. The VGW provisioning service 140, or a separate provisioning service, also may perform similar operations to launch other virtual machines within the provider network, such as virtual machines 165 for use by customers for executing their applications, as well as services 130, etc.

The virtual machine 115 created to provide the VGW functionality also may include a route table 125. The route table 125 may contain one or more entries which contain data usable to determine how to route incoming packets. For example, a separate entry may be added to route table 125 corresponding to each service 130 that the customer has identified to be accessed through the VGW from the remote node 80. The route data contained in a given route table entry may include, for example, a destination value, a target value, and a "next hop" IP address. The destination value may comprise the range of public IP addresses for the service and the target value may comprise the identifier of the VGW 105. The next hop IP address includes an IP address of a networking entity within the provider network to which a packet for the service is to be sent. The networking entity identified by the next hop address may comprise an edge router for the service's local network within the provider network. Once a packet is received by the edge router, the service's edge router is able to forward the packet to an appropriate server within the service's local network to execute the service request contained in the packet. Different and/or additional types of route data may be included in each route table entry.

The route exchange service 150 may store route data for each of the services 130 and may provide such route data to the VGWs that have been designated by their customers to access such services. Such route data specifies how a VGW is to forward an incoming packet to a service targeted by the packet. An example of such route data is described above. The route data for a given service may be changed by the service. For example, usage of a given service may increase to the point that the provider network may scale up the service by adding additional servers and/or virtual machines for execution of that service's application. Further, maintenance on servers that implement the service may necessitate a change of the route data to the service. Regardless of the reason for changing route data for a given service, the route data for packets to access the servers and virtual machines executing the service's applications may need to be changed, expanded, and/or reduced.

Figure 2:
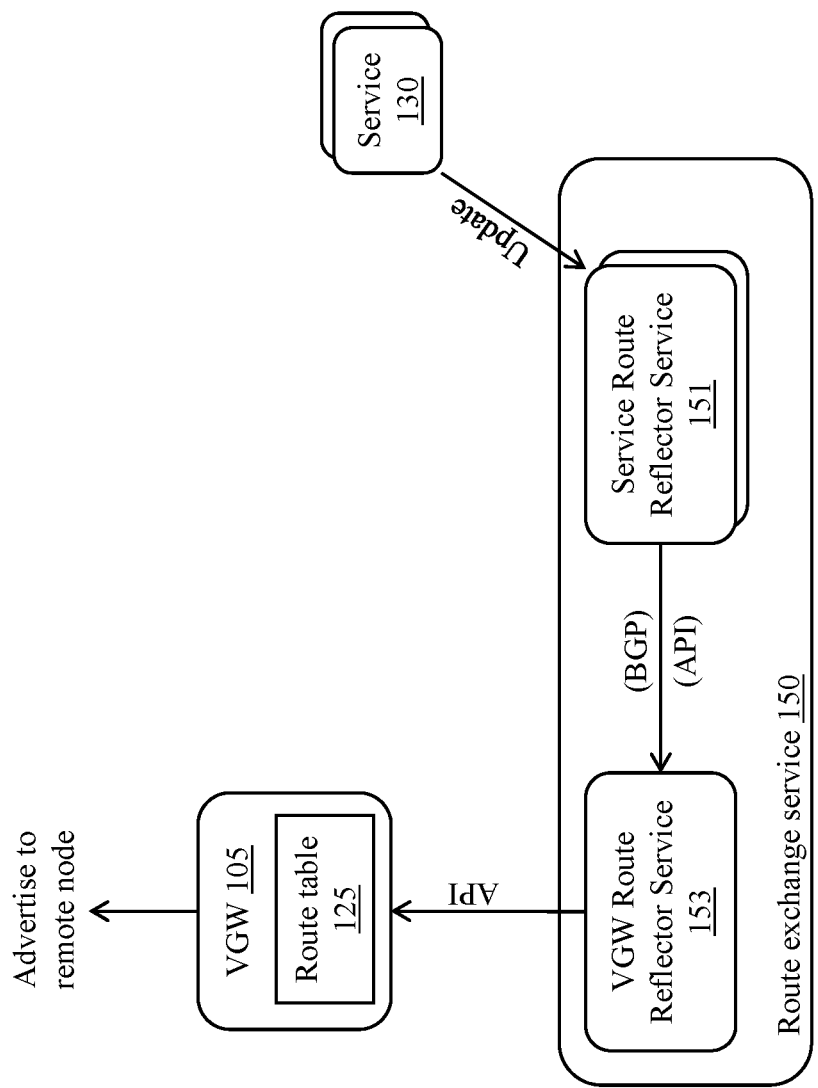
FIG. 2 shows an embodiment for updating route data for services in accordance with various examples.

FIG. 2 shows an embodiment of the route exchange service 150. In this embodiment, the route exchange service 150 may comprise a service route reflector service 151 and a VGW route reflector service 153. The route reflectors 151, 153 may be implemented as machine code executing on servers. Each route reflector 151, 153 is configured to learn the available routes from the other route reflector. Each service 130 may communicate with a separate service route reflector service 151, or multiple services 130 may use a single service route reflector service 151. A single VGW route reflector service 153 may be associated with multiple, or all, VGWs 105, or individual VGWs may be associated with a separate instance of a VGW route reflector service 153.

When a given service 130 updates its route data, the service may provide the updated route data to the service route reflector service 153. The service route reflector service 151 may respond by providing the updated route data to the VGW route reflector service 153. In some embodiments, the route exchange service 150 may implement the Border Gateway Protocol (BGP). The BGP permits the exchange of routing and reachability information between nodes on a network. Using BGP, the route reflector services 151 and 153 engage in the exchange of the updated route data for the service 130. In other embodiments, the service route reflector service 151 does not implement BGP and, instead transmits an API call to the VGW route reflector service 153. The arguments of the API may comprise the updated route data, or include a reference to where such data can be obtained by the VGW route reflector service 153. The API calls may include API calls to add route data, API calls to remove route data, etc. Once the VGW route reflector service 153 receives the updated route data, the VGW route reflector service 153 may submit an API call to each VGW 105 that has been configured to access the service 130 whose route data is being updated. Of course, in other embodiments, the systems can be configured such that the system or service described as the one submitting an API call to a second system or service may alternatively be configured to receive an API call from that second system or service. The updated route data is then added to the route table 125 of each such VGW 105.

Referring again to FIG. 1, upon creation of a VGW by a customer, the VGW provisioning service 140 may submit a request (e.g., an API call) to the route exchange service 150 if the customer has specified one or more particular services 130 to be accessible by the VGW. The request may identify a VGW and may specify the service(s) for which the identified VGW needs route data. The route exchange service 150 then may provide the needed route data to identified VGW 105 to be added to the VGW's route table 125. In another embodiment, the VGW provisioning service 140 may submit an API call to the VGW with an argument specifying the service(s) for which the VGW is to be configured. In response, the VGW may submit a query to the route exchange service 150 to obtain the route data for the specified service(s). In yet another configuration, the VGW 105 can be preconfigured to send an API request to the route exchange service 150 when it comes online. Further, the VGW route reflector service 153 may record which VGWs 105 have routes to particular services. As such, if a service were to change the route data, an update message may be sent by the VGW route reflector service 153 to all VGWs that include route data to that service.

The VGW provisioning service 140 (or an authorization service, not illustrated) also may permit customers, via remote nodes 80, to create service policies 145. For example, the authorization service, separate from the VGW provisioning service, may implement a management interface through which customers can interact to create the service policies 145. Through such an interface, the customer can specify or select a service, select or specify a policy specific to that policy, and request the policy to be implemented. The authorization service may transmit the policy, for example, via API call, to the specified service for implementation thereon. A service policy 145 may limit, for example, access to a given service 130. For example, a customer may have access to storage in a storage service. The customer may create a service policy 145 that restricts access to certain data in the storage service to only access requests that pass through the customer's VGW 105 from the encrypted tunnel 92. The VGW may add a tag to the service request so that the service 130 will be able to determine that the packet passed through the VGW. The tag may comprise a metadata value (such as an identifier or a digital signature) inserted into the service request packet (e.g., into a header field) or into an encapsulation packet that wraps the service request packet that is known apriori by the services to be associated with VGWs. The service policies may be customer-created and may be specific to the underlying services 130.

In some embodiments, security policies 145 may be created through interaction between a customer via remote node 80 and the authentication service or the VGW provisioning service 140. The interaction may be via graphical console implemented by the VGW provisioning service 140 and displayed, for example, by a web browser executing on the remote node or a computer communicatively coupled to the remote node 80. In other embodiments, customer may submit API calls to create the security policies to the VGW provisioning service 140. In some cases, a security policy 145 may be transmitted to the corresponding VGW for compliance assessment and compliance, while in other cases a security policy may be transmitted to the corresponding service 130 for compliance. Whether the policy 145 is provided to a VGW 105 or a service 130 depends on the nature of the service and the policy. In the example above in which the policy is for a storage service to honor access requests to a customer's storage access only from the customer's VGW and ignore access requests that do not pass through the customer's VGW, the security policy would be provided to the storage service.

FIG. 1 shows an example in which the VGW 105 is communicatively coupled to one or more services 130 and to one or more servers 160 on which virtual machines 165 created and used by the customer execute. The customer's virtual machines 165 may run in a virtual network (VN). A VN comprises a logical grouping of virtual machines that run in network defined by a customer. The customer has complete control over defining the environment, including selection of an IP address range, creation of subnets, and configuration of route tables and network gateways. A VN for a customer may be implemented over one or more intermediate physical networks that interconnect host computers on which the customer's virtual machines execute. That is, a virtual network may be implemented over a physical network. Each customer may have their instances operating within a virtual network. A virtual network uses virtual IP addresses and systems operating within the physical network to route packets corresponding to physical IP addresses associated with the machines hosting other virtual machines in the virtual network. The implementation of a virtual network may include modifying or adding additional headers to packets to map virtual addresses consistent with the virtual network to physical addresses associated with the underlying physical network so that the packets can be routed through the physical network between host computers. Each of the host computers that implement a VN for a customer may include a communication manager that may modify outgoing packets destined for a virtual IP address of another virtual machine within the customer's virtual network based on the physical IP addresses used within the provider network. For example, if a communication packet is to be sent between computing nodes in the service provider's network, the originating packet may include an IP address in accordance with a particular protocol (e.g., IPv4), and a virtual machine communication manager associated with the sending host computer embeds the virtual network packet into a substrate network packet which includes physical source and destination IP addresses. The virtual machine communication manager then transmits the packet through an internal network (e.g., switches, routers, etc.) of the provider network. A virtual machine communication manager associated with the receiving host computer receives the substrate packet, extracts the virtual network packet and forwards the virtual network packet on to the targeted virtual machine.

A mapping service may be provided to store, update and provide virtual-to-physical address mappings for use in modifying packets to be transmitted between virtual machines in a virtual network. The virtual network may be implemented in various ways in various embodiments, such as by using IPv4 ("Internet Protocol version 4") or IPv6 ("Internet Protocol version 6") packets as the overlay network packet size. For example, virtual network address information for a virtual network could be embedded in a larger physical packet network address space used for a networking protocol of the one or more intermediate physical networks. As one illustrative example, a virtual network may be implemented using 32-bit IPv4 network addresses, and those 32-bit virtual network addresses may be embedded as part of 128-bit IPv6 network addresses used by the one or more intermediate physical networks, such as by re-headering communication packets or other data transmissions, or otherwise modifying such data transmissions to translate them from a first networking protocol for which they are configured to a distinct second networking protocol. In other embodiments IPv4 packets could be used by the physical network and the virtual network. For example, the size of the IPv4 packet generated by the virtual machine could be limited to a size that can be inserted into an IPv4 packet and leave enough bits so the service provider can add headers to the packet.

In the embodiment of FIG. 1, packets transmitted by the remote node 80 may be routed to the services 130 as explained above, or to a virtual machine 165 within the customer's virtual network. As such, the VGW 105 may provide connectivity to service 130 and/or to the customer's virtual network. Further, FIG. 1 shows an example in which the services 130 are implemented within the provider network 100. However, in other examples, one or more of the services may be implemented outside the provider network but are still accessible via the customers' VGWs 105 hosted on the provider network. The route data provided into the route table by the route exchange service includes routing information usable to access the services whether they are hosted locally (i.e., within the provider network 100) or remotely (i.e., outside the provider network).

Figure 3:
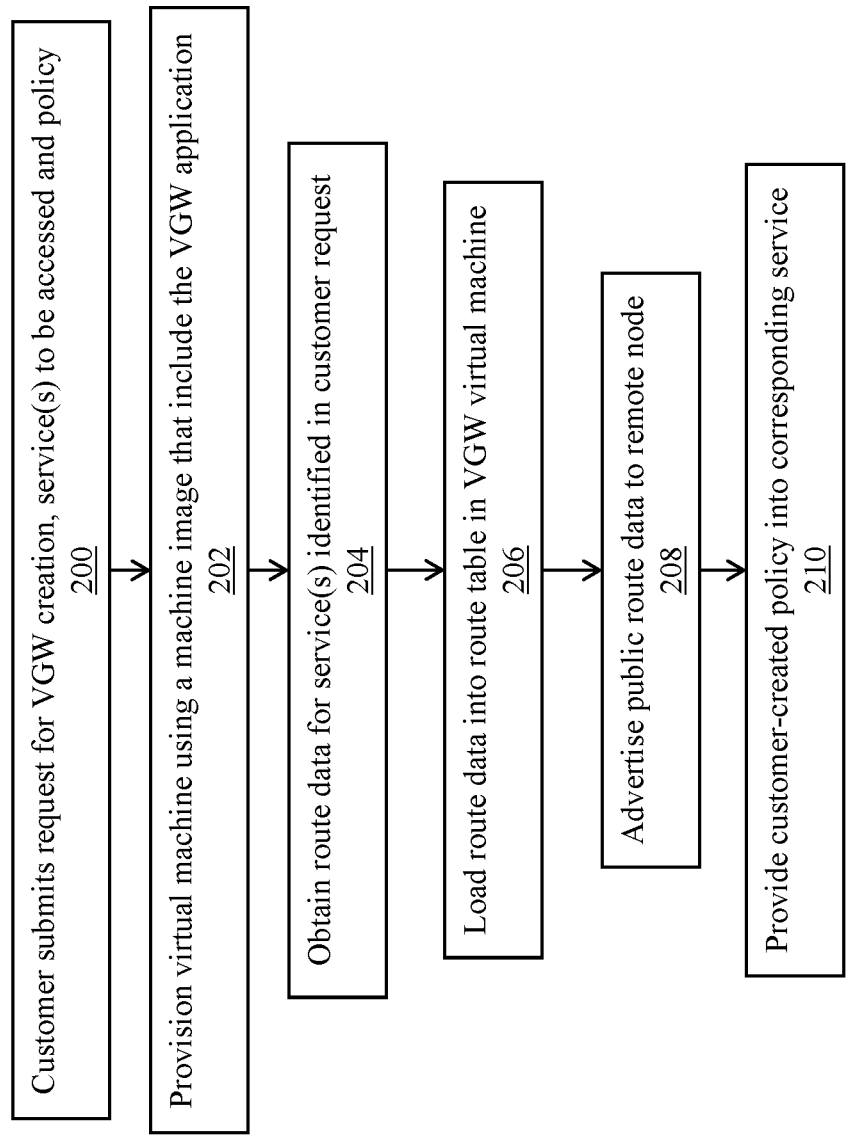
FIG. 3 shows a method of creating a virtual private gateway in accordance with various examples.

FIG. 3 illustrates a method for creating the VGW for a customer. The operations may be performed in the order shown, or in a different order. Further, the operations may be performed sequentially or two or more of the operations may be performed concurrently. At 200, the method may include receiving a request, for example submitted by a customer via a remote node 80, for creation of a VGW along with specifying one or more services to be accessed by the customer via the VGW. A service policy also may be included as part of the request. In some embodiments, the specification of the service(s) to be accessed through the VGW may be part of the request to create the VGW or may be submitted after creation of the VGW in a separate API call. Similarly, the service policy may be part of the request to create the VGW or may be submitted after creation of the VGW. In some embodiments, the request to create the VGW may comprise an API call, while in other embodiments, the request may be made through a graphical user interface (e.g., implemented in a web browser) or a command line interface in which selections can be made by a customer. The creation request may specify the customer's account, the public IP address of the remote node 80 to which the VGW is to establish an encryption tunnel 92, an authentication key, and any other value usable to establish the tunnel 92. The node used by the customer to submit the creation request may be a different computing device than the node that participates in the encrypted tunnel 92 to the VGW 105. Thus, the public IP address submitted with the creation request may or may not be the public IP address of the computing device that submits the request to the VGW provisioning service 140. The VGW provisioning service 140 may receive the request to create the VGW.

At 202, the method includes provisioning a virtual machine on a physical server to implement the requested VGW 105. The provisioning of the virtual machine may include copying a machine image that includes the VGW application 120 on to a server and then booting the virtual machine. This operation also may include establishing a security association in the VGW for use for the tunnel 92. The security association may include an encryption algorithm, an authentication value, the public IP address of the remote node, etc. The VGW may perform the IKE protocol to establish an encryption key. At 204, route data for service(s) identified in the customer request may be obtained by, for example, the route exchange service 150. The route data includes routing information usable by the VGW to forward service requests that are received by the VGW over the encrypted tunnel 92 as explained above. The route data then may be loaded at 206 into the route table established within the VGW 105.

At 208, the VGW 105 advertises the route data to the remote node 80 peered to the VGW. The advertisement may include the public IP address (or range of addresses for the service(s) accessible via the VGW and an identifier of the VGW. This information causes computer systems connected to the encrypted tunnel 92 via a network device, such as a virtual private network (VPN) device, to create packets containing requests for the service to be provided over the encrypted tunnel 92 to the VGW rather than to the service itself via the public Internet.

At 210, the method further includes providing the customer-created policy (if any) into the corresponding service, that is, the service to which the policy applies. Of course, in some embodiments, the policy may be provided to the VGW and not to the service.

Figure 4:
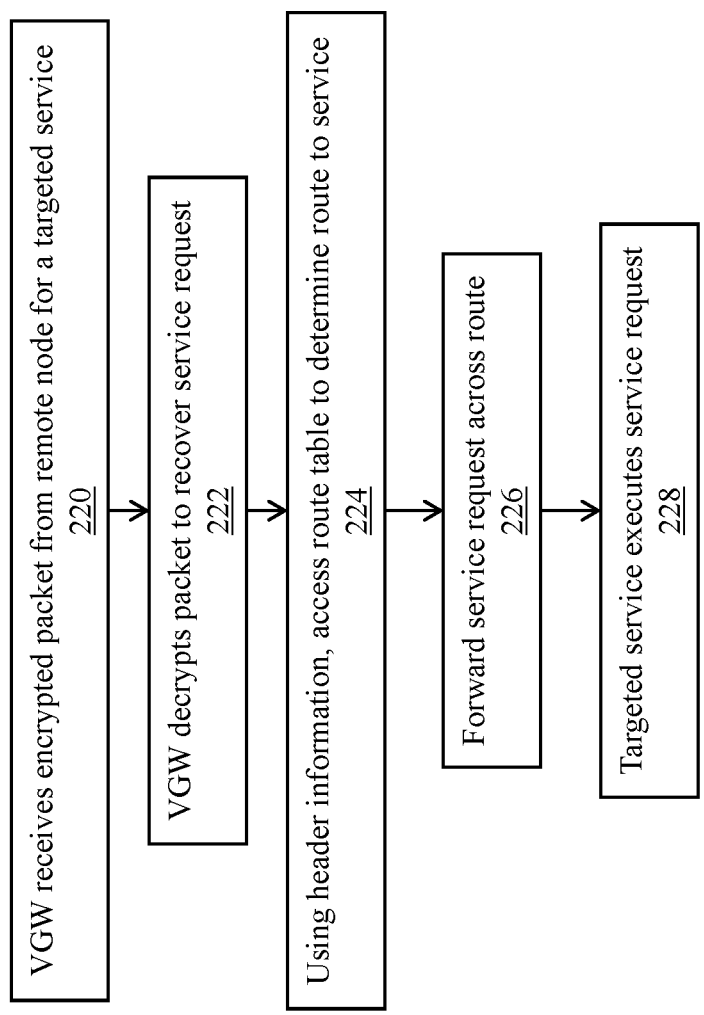
FIG. 4 shows a method performed by the virtual private gateway in accordance with various examples.

FIG. 4 is a method illustrating an example of the operation of the VGW. The operations may be performed in the order shown, or in a different order. Further, the operations may be performed sequentially or two or more of the operations may be performed concurrently. At 220, the method includes the VGW receiving an encrypted packet from a remote node 80 over the tunnel 92. The packet may include a request for a service 130. At 222 the VGW decrypts the packet to recover the unencrypted service request. At 224, using header information in the decrypted packet (e.g., destination IP address), the VGW accesses its route table to determine the appropriate route for the service request.

At 226, the VGW forwards the service request over the route determined using the route table. The targeted service 130 receives the service request at 228 and executes the service request. The service request may contain arguments used by the service to perform its operation. If any data (e.g., response data, acknowledgment, etc.) are to be provided back to the source of the service request (i.e., remote node 80), such data may be included in a packet and routed along a generally reverse route through the VGW 105 and over the tunnel 92 to the remote node. The VGW may encrypt the packet before transmission to the remote node 80.

Figure 5:
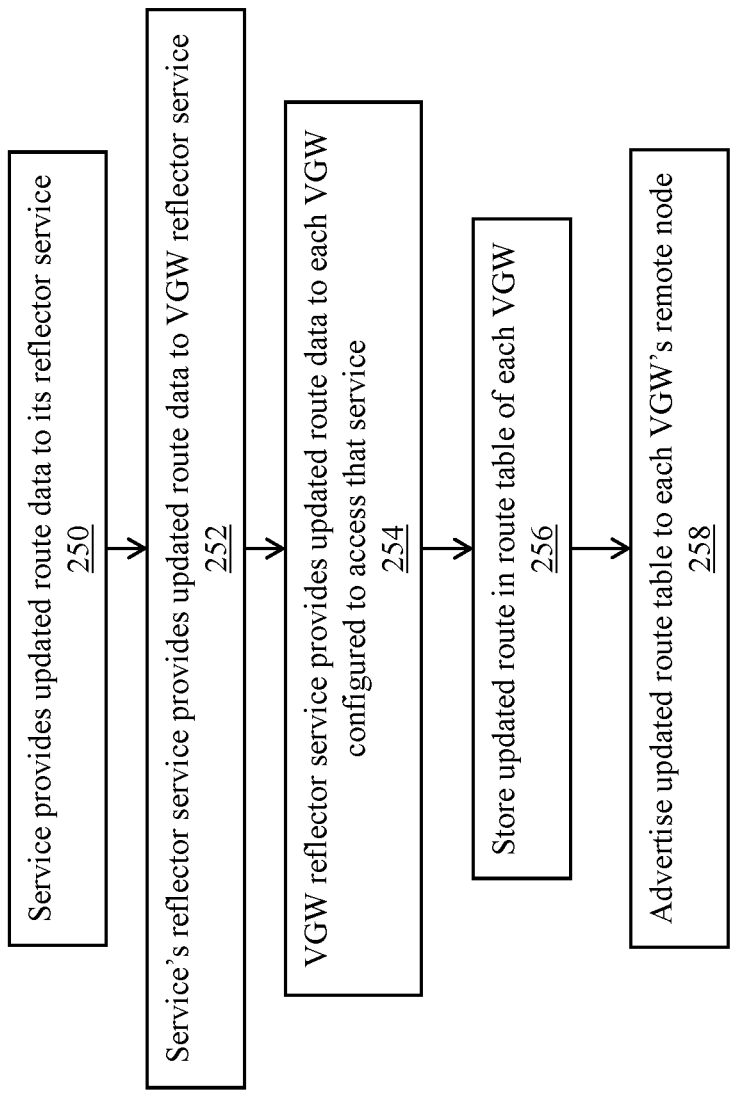
FIG. 5 shows a method for updating route data and distributing the updated route data to virtual private gateways and peered remote nodes.

FIG. 5 shows a method for updating route data for a given service. The operations may be performed in the order shown, or in a different order. Further, the operations may be performed sequentially or two or more of the operations may be performed concurrently. At 250, the method includes the service providing updated route data to its reflector service (e.g., service route reflector service 151). At 252, the service route reflector service 151 may respond by providing the updated route data to the VGW route reflector service 153. As explained above, the BGP protocol may be used to provide the updated route data to the VGW route reflector service, but add, remove, etc., API calls may be used as well to provide the route data updates.

At 254, the method includes the providing the updated route data to each VGW that has been configured to access the service whose route data is being updated. The VGW route reflector service 153 may record the identities of each VGW that have route data for individual services, and thus may forward the updated route data to those VGWs recorded as having routes to the service. Each such VGW then may store at 256 the updated route data received from the VGW route reflector service 153 in its route table 125. At 258, each VGW also may advertise its updated route table to its remote node 80. The advertisement may be in accordance with known protocols or may comprise any suitable type of message exchange. An example of the types of information contained in the advertisements is described above.

In some implementations, customers may change the configuration of their VGWs 105 to add or remove services. For example, a customer may have an existing VGW configured for one or more services as explained above, and subsequently desire to add an additional service to those services accessible through the VGW. Alternatively, a customer may want to remove access to a particular service from a VGW that currently provides such access. Such changes may be initiated through the VGW provisioning service 140 by the customer over the public network 90 via a computing device of the customer. In either case, the route table 125 for the customer's VGW is updated to reflect the change. If a customer wants to add access to a particular service, the customer specifies the service to be added and the VGW provisioning service 140 submits a request to the route exchange service 150 to add route data for the specified service to which ever VGWs the customer has selected to access that service. The VGW provisioning service 140 then submits a message as explained above to the customer's VGW(s) 105. The message may include the route data for the specified service. The route data is then added to the route table 125.

Similarly, if a customer wants to remove access to a service for a given VGW, the customer submits a request to the VGW provisioning service 140 and identifies the VGW and the particular service to be removed. The VGW provisioning service responds to the removal request by submitting a message to the customer-specified VGW. The message includes and identifier of the route data be removed. The VGW then removes the requested route data from the route table 125.

Figure 6:
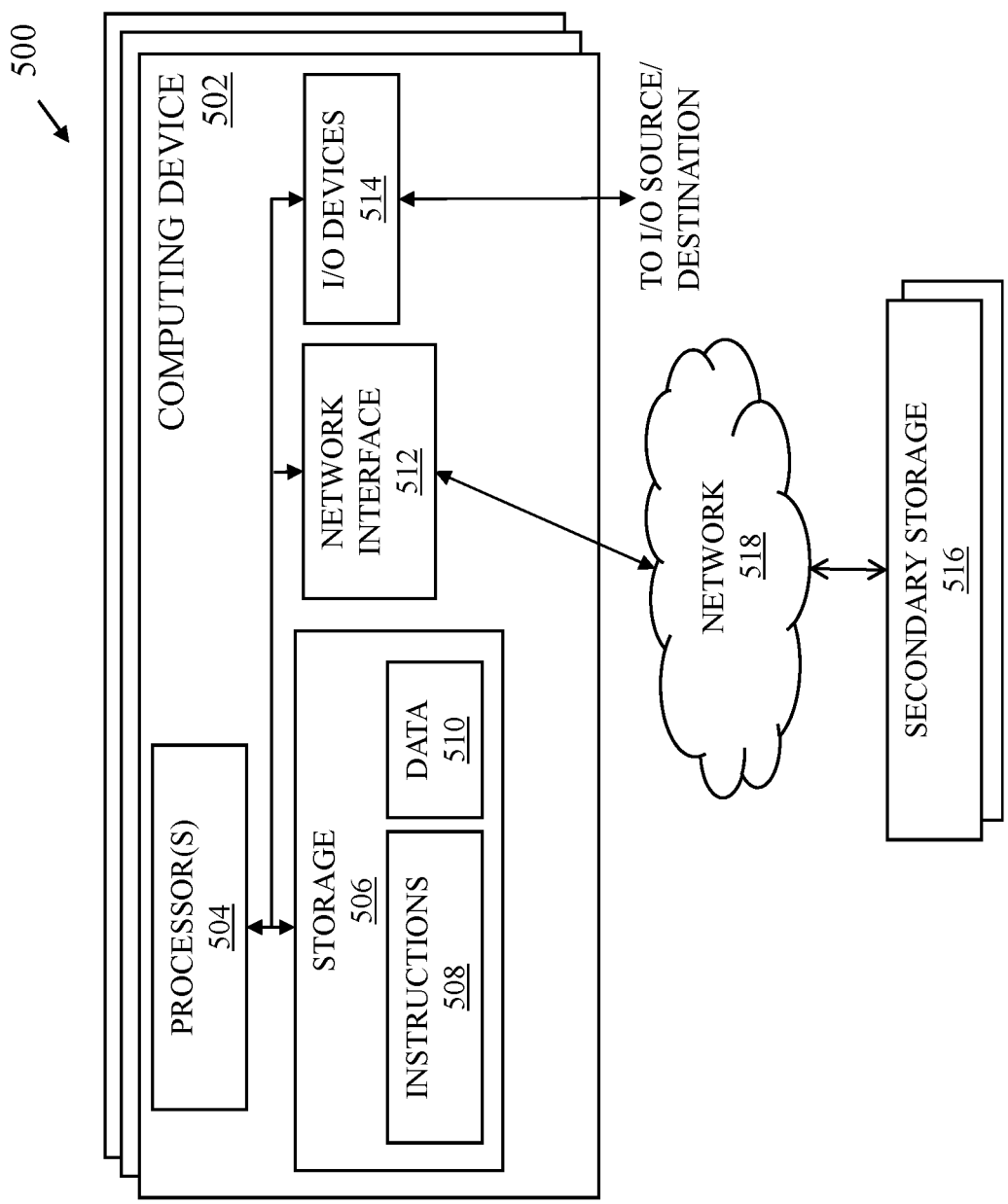
FIG. 6 is a block diagram of a compute device in accordance with various examples.

FIG. 6 shows a schematic diagram for a computing system 500 suitable for implementation of any of the virtual machines (e.g., virtual machines 115, 165), the services 130, the VGW provisioning service 140, the services database 150 as described herein in accordance with various embodiments. The system includes one or more computing devices 502. The computing system 500 includes the computing devices 502 and secondary storage 516 communicatively coupled together via a network 518. One or more of the computing devices 502 and associated secondary storage 516 may be used to provide the functionality of the various services described herein.

Each computing device 502 includes one or m processors 504 coupled to a storage device 506, network interface 512, and I/O devices 514. In some embodiments, a computing device 502 may implement the functionality of more than one component of the system 100. In various embodiments, a computing device 502 may be a uniprocessor system including one processor 504, or a multiprocessor system including several processors 504 (e.g., two, four, eight, or another suitable number). Processors 504 may be any suitable processor capable of executing instructions. For example, in various embodiments, processors 504 may be general-purpose or embedded microprocessors implementing any of a variety of instruction set architectures ("ISM"), such as the x86, PowerPC, SPARC, or MIPS ISAs, or any other itable ISA. In multiprocessor systems, each of processors 504 may, but not necessarily, commonly implement the same ISA. Similarly, in a distributed computing system such as one that collectively implements the provider network 100, each of the computing devices 502 may implement the same ISA, or individual computing nodes and/or replica groups of nodes may implement different ISAs.

The storage device 506 may include a non-transitory, computer-readable storage device configured to store program instructions 508 and/or data 510 accessible by processor(s) 504. The storage device 506 also may be used to store the machine images as explained above. The storage device 506 may be implemented using any suitable volatile memory (e.g., random access memory), non-volatile storage (magnetic storage such as a hard disk drive, optical storage, solid storage, etc.). Program instructions 508 and data 510 implementing the functionality disclosed herein are stored within storage device 506. For example, instructions 508 may include instructions that when executed by processors) 504 implement the various services and/or other components of the service provider's network disclosed herein.

Secondary storage 516 may include additional volatile or non-volatile storage and storage devices for storing information such as program instructions and/or data as described herein for implementing the various aspects of the service provider's network described herein. The secondary storage 516 may include various types of computer-readable media accessible by the computing devices 502 via the network 518. A computer-readable medium may include storage media or memory media such as semiconductor storage, magnetic or optical media, e.g., disk or CD/DVD-ROM, or other storage technologies. Program instructions and data stored on the secondary storage 516 may be transmitted to a computing device 502 for execution by a processor 504 by transmission media or signals via the network 518, which may be a wired or wireless network or a combination thereof. Each of the virtual machines (e.g., virtual machines 115, 165), the services 130, the VGW provisioning service 140, the services database 150 and other components described herein may be implemented as a separate computing device 502 executing software to provide the computing node with the functionality described herein. In some embodiments, some or all of the various services may be implemented by the same computing device.

The network interface 512 may be configured to allow data to be exchanged between computing devices 502 and/or other devices coupled to the network 518 (such as other computer systems, communication devices, input/output devices, or external storage devices). The network interface 512 may support communication via wired or wireless data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 514 may include one or more display terminals, keyboards, keypads, touchpads, mice, scanning devices, voice or optical recognition devices, or any other devices suitable for entering or retrieving data by one or more computing devices 502. Multiple input/output devices 514 may be present in a computing device 502 or may be distributed on various computing devices 502 of the system 500. In some embodiments, similar input/output devices may be separate from computing device 502 and may interact with one or more computing devices 502 of the system 500 through a wired or wireless connection, such as over network interface 512.

References to "based on" should be interpreted as "based at least on." For example, if a determination of a value or condition is "based on" a value of Y, then the determination is based at least on the value of Y; the determination may be based on other values as well.

Those skilled in the art will also appreciate that in some embodiments the functionality disclosed herein may be provided in alternative ways, such as being split among more software modules or routines or consolidated into fewer modules or routines. Similarly, in some embodiments illustrated methods may provide more or less functionality than is described, such as when other illustrated methods instead lack or include such functionality respectively, or when the amount of functionality that is provided is altered. In addition, while various operations may be illustrated as being performed in a particular manner e.g., in serial or in parallel) and/or in a particular order, those skilled in the art will appreciate that in other embodiments the operations may be performed in other orders and in other manners. The various methods as depicted in the figures and described herein represent illustrative embodiments of methods. The methods may be implemented in software, in hardware, or in a combination thereof in various embodiments. Similarly, the order of any method may be changed, and various elements may be added, reordered, combined, omitted, modified, etc., in various embodiments.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

What is claimed is:

1. A system, comprising:
 a virtual private gateway (VGW) provisioning service, including a memory coupled to a processor, wherein the memory includes instructions that upon execution causes the VGW provisioning service to:
  receive a request to establish a VGW from a customer of a service provider, the request specifying a service to be accessible through the VGW and a customer-configurable policy, wherein the customer-configurable policy restricts access to the specified service to requests sent via the VGW to the specified service, and wherein the service is provided by the service provider to the customer;
  responsive to the request, instantiate a VGW virtual machine on a compute device, the VGW virtual machine including a VGW application configured to establish a secure tunnel over a public network to a remote node and to receive encrypted traffic from the remote node over the secure tunnel;
  cause route data for the specified service to be provided to the VGW virtual machine, wherein the VGW application includes instructions that upon execution cause the VGW application to advertise the route data for the specified service over the secure tunnel; and
  provide the customer-configurable policy to the identified service for compliance by the service.

2. The system of claim 1, wherein the route data includes a public internet protocol (IP) address associated with the specified service, and an identifier of the customer's VGW.

3. The system of claim 1, wherein the VGW provisioning service is configured to cause the route data for the specified service to be provided to the VGW virtual machine through submission of a route request to a route exchange service, wherein the route request identifies the specified service, and wherein the route exchange service is configured to submit an application programming interface (API) call to the customer's VGW, the API call including the route data.

4. The system of claim 1, wherein:
 responsive to a given service updating route data for the given service, the service updates a route record in a database accessible to a service route reflector service, the record corresponding to the given service;
 the service route reflector service submits the updated route data to a VGW route reflector service; and
 the service route reflector service submits a message to each VGW that contains route data for the given service, the message including the updated route data.

5. The system of claim 1, wherein the VGW application further includes instructions that upon execution cause the VGW application to, responsive to the VGW application receiving an encrypted packet from a remote node over the secure tunnel, the encrypted packet containing a service request for the specified service:
 decrypt the encrypted packet to obtain the service request;
 using information in headers of the service request, access a route table to determine a route to the service targeted by the service request; and
 forward the service request across the determined route to the service targeted by the request; and
 wherein the service is configured to execute the service request.

6. A system, comprising:
 a virtual private gateway (VGW) provisioning service, including a memory coupled to a processor, wherein the memory includes instructions that upon execution causes the VGW provisioning service to:
  receive a request to establish a VGW, the request specifying a service provided by a service provider to its customers to be accessible through the VGW;
  responsive to the request, instantiate a VGW virtual machine on a compute device, the VGW virtual machine including a VGW application configured to establish a secure tunnel over a public network to a remote node and to receive encrypted traffic from the remote node over the secure tunnel;
  cause route data for the specified service to be provided to the VGW virtual machine.

7. The system of claim 6, wherein the route data for the service includes a public internet protocol (IP) address of the specified service, and wherein the VGW application is configured to advertise the public IP address to a remote node over a public network.

8. The system of claim 7, wherein generation of an updated public internet protocol (IP) address for the service causes:
 the service to update a route entry in a route exchange service with updated route data containing the updated public IP address;
 the route exchange service to submit the updated route data for the service to the VGW virtual machine; and
 the VGW application to advertise the updated route data for the service to the remote node.

9. The system of claim 6, wherein, the VGW application further includes instructions that upon execution, responsive to receipt of an encrypted packet from a remote node over the secure tunnel and the encrypted packet containing a service request for the identified service, cause the VGW application to:
- decrypt the encrypted packet to obtain the service request;
- using information in headers of the service request, access a route table to determine a route to the service targeted by the service request; and
- forward the service request across the determined route to the service targeted by the request.

10. The system of claim 9, wherein the VGW application is configured to implement Internet Protocol Security (IPSec) for the secure tunnel.

11. The system of claim 6, further comprising a route exchange service containing a route table configured to include route data for a plurality of services, and wherein the VGW provisioning service is configured to submit a request to the route exchange service to provide the route data for the specified service.

12. The system of claim 6, wherein the request includes a customer-configurable policy that is configured to restrict access to the specified service.

13. The system of claim 12, wherein the specified service is configured to receive the customer-configurable policy and to apply the customer-configurable policy to at least a portion of requests.

14. The system of claim 12, wherein the VGW application is configured to receive the customer-configurable policy and to ensure compliance with the customer-configurable policy.

15. A method, comprising:
- decrypting, by a virtual private gateway (VGW), an encrypted packet containing a request for a service implemented on a service provider network and received by the VGW from a node over a public network, the service being provided by a service provider to customers of the service provider;
- accessing a route table within the VGW to determine a route to the service within the service provider network;
- forwarding the request, by the VGW, over the route to the service;
- receiving, by the VGW, updated route data for the service, the updated route data including an updated public internet protocol (IP) address for the service; and
- advertising, by the VGW, the updated public IP address.

16. The method of claim 15 further comprising:
- provisioning a VGW virtual machine on a server responsive to a request for creation of the virtual machine, the creation request specifying the service;
- responsive to a route request for the route data associated with the specified service, providing the route data to the VGW; and
- loading the route data in a route table in the provisioned virtual machine.

17. The method of claim 15 further comprising generating a customer-configurable policy restricting access to the service and transmitting the customer-configurable policy to the service to perform policy compliance.

18. The method of claim 15, wherein receiving the updated route data for the service includes:
- providing the updated route data to a service reflector service;
- implementing the border gateway protocol (BGP) to provide the updated route data from the service reflector service to a VGW reflector service; and
- providing the updated route data from the VGW reflector service to the VGW.

19. The method of claim 15, further comprising tagging the request with an identifier indicative of the VGW before forwarding the request over the route.

20. The method of claim 15, further comprising executing the request by the service, wherein executing the service comprises at least one of:
- accessing storage or a database allocated for exclusive use by a customer that submitted the request; and
- executing customer-supplied code.

* * * * *